United States Patent
Taylor et al.

(10) Patent No.: US 11,454,181 B2
(45) Date of Patent: Sep. 27, 2022

(54) SYSTEM AND METHOD FOR AVOIDING COMPRESSOR SURGE DURING CYLINDER DEACTIVATION OF A DIESEL ENGINE

(71) Applicants: Purdue Research Foundation, West Lafayette, IN (US); Eaton Intelligent Power Limited, Dublin (IE)

(72) Inventors: Alexander H. Taylor, Ann Arbor, MI (US); Troy E. Odstrcil, Renton, WA (US); Gregory M. Shaver, Lafayette, IN (US); James E. McCarthy, Jr., Kalamazoo, MI (US)

(73) Assignees: Purdue Research Foundation, West Lafayette, IN (US); Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/000,416

(22) Filed: Aug. 24, 2020

(65) Prior Publication Data
US 2021/0017922 A1 Jan. 21, 2021

Related U.S. Application Data

(63) Continuation of application No. PCT/US2019/019591, filed on Feb. 26, 2019.
(Continued)

(51) Int. Cl.
*F02D 41/00* (2006.01)
*F02D 17/02* (2006.01)

(52) U.S. Cl.
CPC ......... *F02D 41/0087* (2013.01); *F02D 17/02* (2013.01); *F02D 2200/0406* (2013.01);
(Continued)

(58) Field of Classification Search
CPC .......... F02D 41/0087; F02D 17/02; F02D 2200/0406; F02D 2200/0411;
(Continued)

(56) References Cited

U.S. PATENT DOCUMENTS 6,293,103 B1 * 9/2001 Gladden ............... F02B 33/446
416/198 A
6,298,718 B1 * 10/2001 Wang ................... F02D 41/0007
701/100
(Continued)

FOREIGN PATENT DOCUMENTS

DE  10 2007 014 646 A1   10/2007
GB       2507061 A  *   4/2014
(Continued)

OTHER PUBLICATIONS

"Reducing Diesel Engine Drive Cycle Fuel Consumption through Use of Cylinder Deactivation . . . "; Published Aug. 8, 2017; retrieved from the internet Feb. 8, 2022; URL: https://www.frontiersin.org/article/10.3389/fmech.2017.00008; Journal: Frontiers in Mechanical Engineering (Year: 2017).*

(Continued)

*Primary Examiner* — Sizo B Vilakazi
*Assistant Examiner* — Brian R Kirby
(74) *Attorney, Agent, or Firm* — Woodard, Emhardt, Henry, Reeves & Wagner, LLP

(57) ABSTRACT

A system and method for improving the functioning of a turbocharged diesel engine equipped with a cylinder deactivation system includes detecting when the turbocharged diesel engine is at risk of compressor surge, and then delaying the implementation of the cylinder deactivation. The delay may be a set period of time, or it may be determined by performing a set of instructions effective for estimating changes in intake manifold pressures over time if
(Continued)

cylinders are deactivated, and then comparing the intake manifold pressure estimates to acceptable intake manifold pressure information. A formula for performing the required estimates is provided.

29 Claims, 11 Drawing Sheets

Related U.S. Application Data

(60) Provisional application No. 62/635,441, filed on Feb. 26, 2018.

(52) U.S. Cl.
CPC ............ *F02D 2200/0411* (2013.01); *F02D 2200/0414* (2013.01); *F02D 2200/101* (2013.01)

(58) Field of Classification Search
CPC ....... F02D 2200/0414; F02D 2200/101; F02D 23/00; F02D 17/00; F02D 41/00; F02D 13/06; Y02T 10/12
USPC ...................................... 60/605.1
See application file for complete search history.

(56) References Cited

U.S. PATENT DOCUMENTS

| | | | | |
|---|---|---|---|---|
| 6,408,624 | B1* | 6/2002 | Books | F02D 41/0007 60/601 |
| 7,047,742 | B2 | 5/2006 | Kono | F02M 26/02 60/605.1 |
| 7,089,738 | B1* | 8/2006 | Boewe | F02M 26/48 123/568.21 |
| 7,296,561 | B2* | 11/2007 | Shirakawa | F02D 41/0005 123/568.21 |
| 7,322,194 | B2* | 1/2008 | Sun | F02B 37/16 60/602 |
| 7,665,433 | B2* | 2/2010 | Sugihara | F01L 9/14 123/347 |
| 7,668,704 | B2* | 2/2010 | Perchanok | F02D 41/0007 703/2 |
| 8,307,645 | B2* | 11/2012 | Mischler | F02D 23/02 415/17 |
| 9,037,384 | B2* | 5/2015 | Koch | F02D 41/0087 60/611 |
| 9,765,712 | B2* | 9/2017 | Arslanturk | F02D 21/08 |
| 10,598,105 | B2* | 3/2020 | Reisenberger | F02D 41/0007 |
| 2002/0004004 | A1* | 1/2002 | Fledersbacher | F04D 29/685 415/151 |
| 2005/0188695 | A1* | 9/2005 | Shirakawa | F02D 41/005 60/297 |
| 2007/0012030 | A1* | 1/2007 | Shirakawa | F01N 3/0807 123/568.21 |
| 2007/0095063 | A1 | 5/2007 | Mischler et al. | |
| 2007/0137199 | A1 | 6/2007 | Magner et al. | |
| 2009/0018756 | A1* | 1/2009 | Storhok | F02D 41/0007 123/90.15 |
| 2011/0132322 | A1* | 6/2011 | Boyer | F02M 26/05 123/568.21 |
| 2011/0265454 | A1* | 11/2011 | Smith | F01N 3/10 123/481 |
| 2012/0186249 | A1* | 7/2012 | Guzzella | F02B 29/00 60/612 |
| 2012/0204570 | A1* | 8/2012 | Herdin | F01N 3/04 60/773 |
| 2013/0073187 | A1* | 3/2013 | Koch | F02D 41/0087 60/611 |
| 2014/0331667 | A1* | 11/2014 | Kindl | F02M 26/43 60/605.1 |
| 2014/0366529 | A1* | 12/2014 | Komatsu | F02D 13/02 60/600 |
| 2015/0047605 | A1* | 2/2015 | Buckland | F02B 37/164 123/403 |
| 2015/0204279 | A1* | 7/2015 | Kemmerling | F02D 41/0007 123/568.11 |
| 2015/0292443 | A1* | 10/2015 | Arslanturk | F02D 21/08 60/605.2 |
| 2015/0345371 | A1* | 12/2015 | Russ | F02B 37/22 123/542 |
| 2016/0061104 | A1* | 3/2016 | Hirayama | F02B 37/004 60/602 |
| 2016/0138501 | A1* | 5/2016 | Keating | F02B 37/007 60/605.1 |
| 2016/0153338 | A1* | 6/2016 | Park | F01N 9/00 60/276 |
| 2016/0312687 | A1 | 10/2016 | Kemmerling et al. | |
| 2016/0333827 | A1* | 11/2016 | Smiljanovski | F02M 26/07 |
| 2017/0030279 | A1* | 2/2017 | Bartsch | F02D 13/0249 |
| 2017/0114736 | A1* | 4/2017 | Iida | F02D 41/107 |
| 2017/0138278 | A1* | 5/2017 | Xiao | F02D 41/0005 |
| 2017/0211588 | A1* | 7/2017 | Kindl | F04D 29/22 |
| 2017/0305411 | A1* | 10/2017 | Leone | F02D 21/08 |
| 2017/0335805 | A1* | 11/2017 | Zhang | F01N 5/025 |
| 2017/0349164 | A1* | 12/2017 | Miller | B60W 10/08 |
| 2019/0226378 | A1* | 7/2019 | Chen | F01N 9/00 |
| 2020/0240424 | A1* | 7/2020 | Vijayakumar | F02B 37/22 |

FOREIGN PATENT DOCUMENTS

GB      2507061 A    4/2014
WO   WO 2016/184552 A1   11/2016

OTHER PUBLICATIONS

US 2007/0234983—US patent relating to DE 102007014646.

* cited by examiner

CALCULATE:

predicted future IMP (Normalized w/ $P_{amb}$) = $Y_{predicted}$

COMPARE WITH:

predicted future reduced-compressor-mass flow
= $m_{out}$ = $X_{predicted}$.

DECISION RULE 1:

If $Y_{MODIFIED}(X_{predicted}) > Y_{predicted}$,
no surge is predicted.

DECISION RULE 2:

If $Y_{MODIFIED}(X_{predicted}) < Y_{predicted}$,
surge is predicted.

FIG. 5

SYSTEM AND METHOD FOR AVOIDING COMPRESSOR SURGE DURING CYLINDER DEACTIVATION OF A DIESEL ENGINE

REFERENCE TO RELATED APPLICATIONS

This application claims priority from U.S. Provisional Patent Application No. 62/635,441, filed 26 Feb. 2018.

FIELD OF THE INVENTION

The present invention relates generally to systems and methods for improving the functioning of a diesel engine, and more particularly to systems and methods for improving the functioning of a turbocharged diesel engine by avoiding turbocharger compressor surge.

BACKGROUND TO THE INVENTION

Exhaust aftertreatment systems are now the norm for diesel engine-based systems. Aftertreatment systems are required to meet the stringent tailpipe emission regulations for oxides of nitrogen (NOx), unburned hydrocarbons (UHC), and particulate matter (PM). One challenge with exhaust aftertreatment systems is thermal management, where individual components of the system must reach, and be maintained above, effective operating temperatures before they reach peak efficiency for conversion of pollutants into harmless byproducts. Unfortunately, today's systems generally require more fuel consumption to meet these temperature requirements.

One method for increasing the aftertreatment component temperatures while reducing fuel consumption is cylinder deactivation (CDA). CDA applied during fueled engine operation has been shown to increase turbine outlet temperatures from 190 to 310° C. with a 39% reduction in fuel consumption at loaded idle compared to conventional methods of aftertreatment thermal management.

SUMMARY OF THE INVENTION

In one aspect of the invention there is provided a method for improving the functioning of a turbocharged diesel engine. A preferred embodiment of the inventive method comprises detecting when the turbocharged diesel engine is at risk of compressor surge, and then delaying all or part of a subsequent cylinder deactivation event.

The "detecting" portion of the inventive method may be accomplished by using data from the ECU, such as a change in engine load, or by observing other characteristics such as changes in gas pedal position. Alternatively, the detection step may be accomplished by continuously calculating estimates of changes in intake manifold pressures, and then comparing those estimates to information regarding the compressor surge conditions of the engine to determine whether deactivation of one or more cylinders can occur without presenting a risk of compressor surge. In one preferred embodiment the detecting step is accomplished by calculating estimates of changes in intake manifold pressure for specific CDA conditions, and then comparing those estimates to the compressor surge line for the engine to determine whether deactivation of one or more cylinders will avoid compressor surge, and then moving into cylinder deactivation as quickly as possible while avoiding compressor surge.

The estimates may be calculated by a set of steps comprising:

a) measuring or estimating the mass flow rate of fresh air leaving the compressor of a turbocharged diesel engine;

b) measuring or estimating the intake manifold pressure of said engine;

c) measuring or estimating the engine speed of said engine;

d) measuring or estimating the exhaust gas recirculation fraction of said engine;

e) measuring or estimating the intake manifold temperature of said engine;

f) providing information indicating the displacement of the engine, the future number of active cylinders, the volumetric efficiency of the engine, and the volume of the intake tract;

e) using the mass flow rate information, the intake manifold pressure information, the engine speed information, the exhaust gas recirculation fraction information, the intake manifold temperature information, the engine displacement information, the volumetric efficiency information, and the intake tract volume information to estimate changes in intake manifold pressures over time if some or all engine cylinders are deactivated;

f) comparing the intake manifold pressure estimates to acceptable intake manifold pressure information to determine whether deactivating cylinders would be expected to produce an unacceptable intake manifold pressure at any relevant time subsequent to a cylinder deactivation; and g) if the comparison of step (f) indicates that one or more cylinders could be deactivated without being expected to produce an unacceptable intake manifold pressure at any relevant time, deactivating the greatest number of cylinders that may be deactivated without producing an unacceptable intake manifold pressure;

wherein each of said estimates of the change in expected intake manifold pressure over time is determined using the formula:

$$P_i + 1 = \frac{\dot{m}_{in} + \frac{P_i V_{intake}}{RT \, \Delta t}}{\frac{V_{disp} num_{cyc} \eta_{vol} RPM(1 - EGR_{frac})}{120 \, RT} + \frac{V_{intake}}{RT \, \Delta T}}$$

where:

| Symbol | Description |
| --- | --- |
| $\dot{m}_{in}$ | Mass flow rate of fresh air leaving the compressor |
| $P_i$ | Intake Manifold Pressure at instant i |
| $V_{disp}$ | Displacement of the Engine |
| $num_{cyl}$ | Future Number of Active Cylinders |
| $\eta_{vol}$ | Volumetric Efficiency |
| RPM | Engine Speed |
| $EGR_{frac}$ | EGR Fraction (0 when motoring) |
| R | Universal Gas Constant |
| T | Universal Manifold Temperature |
| $V_{intake}$ | Volume of the Intake Tract |
| $\Delta t$ | Change in Time (0.1 s) |

In another embodiment the method comprises:

detecting when the turbocharged diesel engine is at risk of compressor surge by calculating a first set of estimates of changes in intake manifold pressures over time;

comparing the first set of estimates to information regarding the compressor surge conditions of the engine to determine whether deactivation of one or more cylinders will avoid compressor surge;

implementing a first stage of cylinder decompressions;

subsequently detecting when the turbocharged diesel engine is at risk of compressor surge by calculating second estimates of changes in intake manifold pressures over time;

comparing those estimates to information regarding the compressor surge conditions of the engine to determine whether deactivation of one or more cylinders will avoid compressor surge;

implementing a second stage of cylinder decompressions.

In another embodiment the engine cylinder deactivation occurs as a series of individual cylinder deactivations until an appropriate number of engine cylinders has been deactivated. This may be accomplished, for example, by:

a) continuously calculating estimates of IMP under conditions of cylinder deactivation;

b) comparing those estimates to information regarding the compressor surge conditions of the engine to determine whether deactivation of one or more cylinders can occur without presenting a risk of compressor surge;

c) using information developed by that comparison determine whether the deactivation of one or more cylinders should occur or be delayed;

d) causing the cylinder deactivation module to deactivate the greatest number of cylinders that can be deactivated without presenting a risk of compressor surge;

e) continuing to calculate estimates of IMP under conditions of cylinder deactivation;

f) comparing those estimates to information regarding the compressor surge conditions of the engine to determine whether deactivation of one or more additional cylinders can occur without presenting a risk of compressor surge;

g) using information developed by that comparison determine whether the deactivation of one or more additional cylinders can occur or should be delayed;

h) causing the cylinder deactivation module to deactivate the greatest number of cylinders that can be deactivated without presenting a risk of compressor surge.

The "delaying" portion of the inventive method may be accomplished by delaying the cylinder deactivation for a pre-set period of time, which is preferably between 0.5 seconds and 5 seconds, and is most preferably between 0.5 seconds and 3 seconds. Alternatively, the delay may be implemented by using the information obtained in the detecting step to identify a cylinder deactivation sequence effective for avoiding compressor surge, and then implementing that identified sequence.

Another aspect of the present invention provides an improved turbocharged diesel engine. A preferred embodiment of the improved turbocharged diesel engine comprises:

a) a plurality of cylinders;
b) an air intake;
c) an air intake manifold;
d) a compressor;
e) a turbine;
f) an engine control module (ECM); and
g) a cylinder deactivation (CDA) controller effective for controlling the deactivation of one or more cylinders;

wherein the engine control module is adapted to work with the CDA controller to delay the deactivation of said one or more cylinders upon detection of conditions under which the turbomachinery is at risk of compressor surge.

The detecting step may detect when the engine is transitioning from a high-load engine operation above 3 bar BMEP to a non-fired engine operation.

The engine control module may work with the CDA controller to delay the deactivation of a set number of cylinders for a set period of time upon detecting a risk for compressor surge. The pre-set period of time may be between 0.5 s and 3 s.

In another embodiment the engine additionally comprises:

a sensor for measuring, or system for estimating, the mass flow rate of fresh air leaving the compressor of a turbocharged diesel engine;

a sensor for measuring, or system for estimating, the intake manifold pressure of the engine;

a sensor for measuring, or system for estimating, the engine speed of the engine;

a sensor for measuring, or system for estimating, the exhaust gas recirculation fraction of the engine; and a sensor for measuring, or system for estimating, the intake manifold temperature of the engine; and information storage effective for storing information comprising: i) the displacement of the engine, ii) the volumetric efficiency of the engine, and iii) the volume of the intake tract. In such embodiments the engine control module and the CDA controller may work together to delay the deactivation of said one or more cylinders by performing a set of steps, comprising:

a) measuring or estimating the mass flow rate of fresh air leaving the compressor of a turbocharged diesel engine;

b) measuring or estimating the intake manifold pressure of said engine;

c) measuring or estimating the engine speed of said engine;

d) measuring or estimating the exhaust gas recirculation fraction of said engine;

e) measuring or estimating the intake manifold temperature of said engine;

f) providing information indicating the displacement of the engine, the future number of active cylinders, the volumetric efficiency of the engine, and the volume of the intake tract;

g) using the mass flow rate information, the intake manifold pressure information, the engine speed information, the exhaust gas recirculation fraction information, the intake manifold temperature information, the engine displacement information, the volumetric efficiency information, and the intake tract volume information to estimate changes in intake manifold pressures over time if no or some or all engine cylinders are deactivated;

h) comparing the intake manifold pressure estimates to acceptable intake manifold pressure information to determine whether deactivating cylinders would be expected to produce an unacceptable intake manifold pressure at any relevant time subsequent to a cylinder deactivation; and i) if the comparison of step (h) indicates that one or more cylinders could be deactivated without being expected to produce an unacceptable intake manifold pressure at any relevant time, deactivating the greatest number of cylinders that may be deactivated without producing an unacceptable intake manifold pressure;

wherein each of said estimates of the change in expected intake manifold pressure over time is determined using the formula:

$$P_i + 1 = \frac{m_{in} + \frac{P_i V_{intake}}{RT \Delta t}}{\frac{V_{disp} num_{cyc} \eta_{vol} RPM(1 - EGR_{frac})}{120 \, RT} + \frac{V_{intake}}{RT \Delta T}}$$

where:

| Symbol | Description |
| --- | --- |
| $\dot{m}_{in}$ | Mass flow rate of fresh air leaving the compressor |
| $P_i$ | Intake Manifold Pressure at instant i |
| $V_{disp}$ | Displacement of the Engine |
| $num_{cyl}$ | Future Number of Active Cylinders |
| $\eta_{vol}$ | Volumetric Efficiency |
| RPM | Engine Speed |
| $EGR_{frac}$ | EGR Fraction (0 when motoring) |
| R | Universal Gas Constant |
| T | Universal Manifold Temperature |
| $V_{intake}$ | Volume of the Intake Tract |
| $\Delta t$ | Change in Time (0.1 s) |

Another aspect of the present invention provides a product useful for implementing certain aspects of the present invention. The product may comprise a tangible memory device having stored thereon information for performing the inventive method on a diesel engine.

BRIEF DESCRIPTION OF THE DRAWINGS

FIG. 5 shows a decision method for determining whether compressor surge is likely to occur, according to one embodiment of the present invention.

DESCRIPTION OF THE PREFERRED EMBODIMENTS

Figure 1:
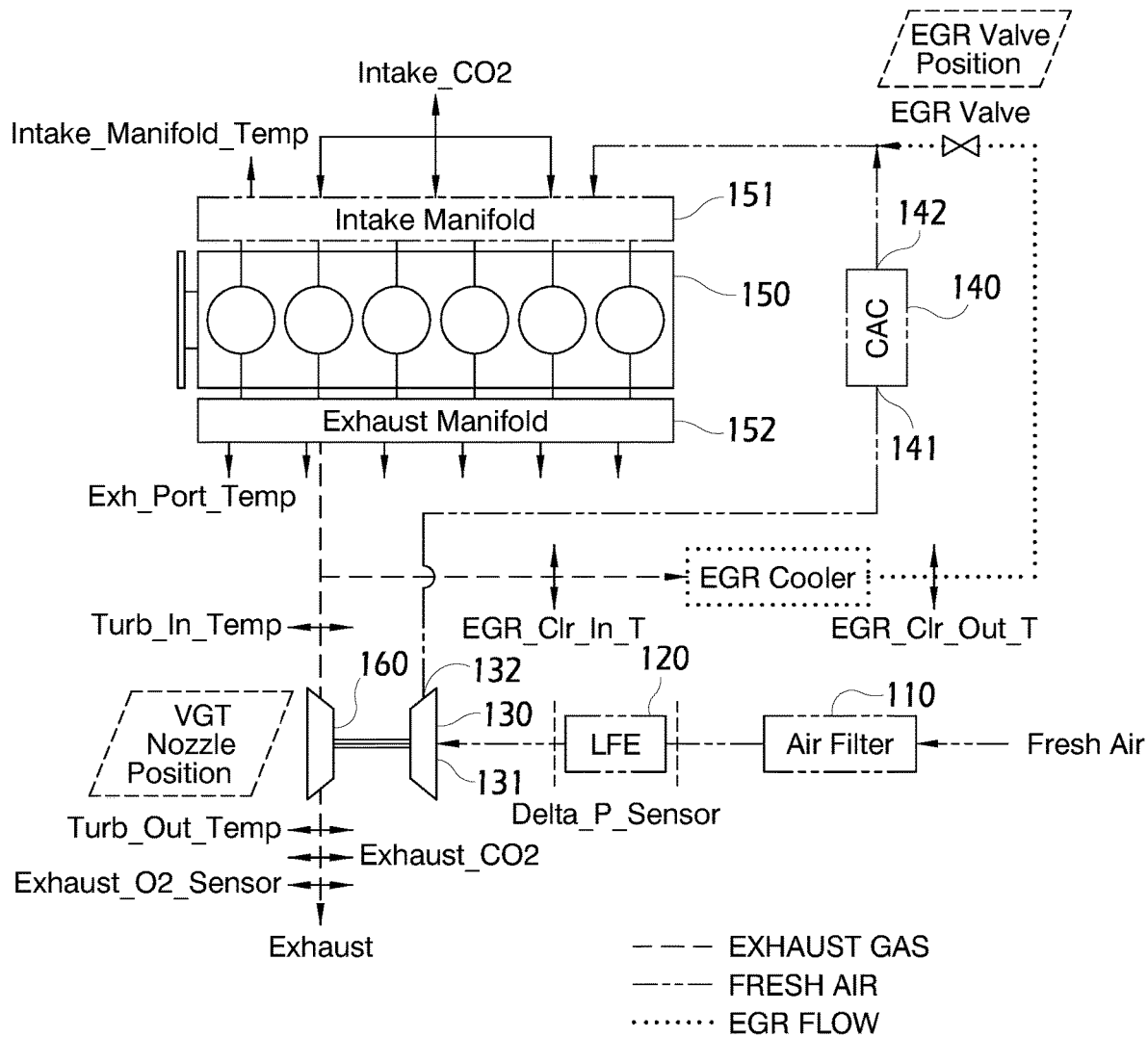
FIG. 1 shows airflow pathways through the engine intake and exhaust, with associated sensors, according to one preferred embodiment of the present invention.
Figure 2:
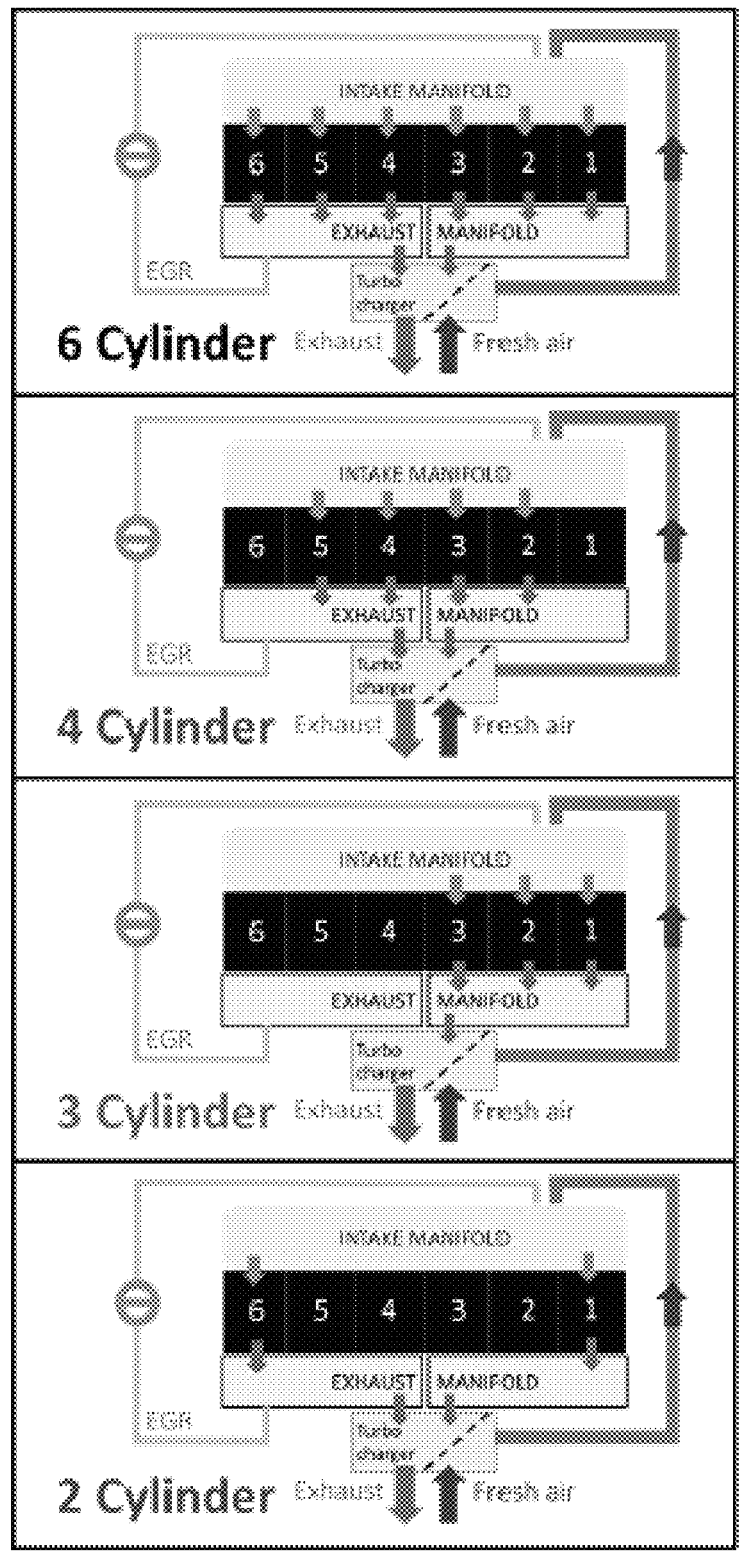
FIG. 2 shows airflow though the engine when operating with 6, 4, 3, or 2 cylinders.

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

As indicated above, one aspect of the present invention relates to a system and method for improving the function of a turbo-charged diesel engine that has a cylinder deactivation system incorporated therein. However, in other aspects the invention has applicability to engines with other forms of compression, including turbo-chargers for gasoline powered engines, E-boost, superchargers, etc., for which compressor surge may be a problem. Similarly, the inventive systems and methods may be applied to other VVA-enabled low-load, low air flow strategies, including reverse breathing, intake rebreathing, iEGR, and ventilated cylinder cutout Cylinder deactivation (CDA) provides benefits for exhaust thermal management and fuel savings. CDA applied during fueled engine operation has been shown to increase turbine outlet temperatures from 190 to 310° C. with a 39% reduction in fuel consumption at loaded idle compared to conventional methods. Optimum conversion efficiency of NOx to H2O and N2 within the SCR occurs above 200° C. CDA can also be implemented on some, or all, cylinders during engine motoring events to reduce the cool-off rate of the aftertreatment components A first aspect of the present invention is the discovery that compressor surge may occur when a diesel engine equipped with cylinder deactivation transitions from high load operation to low load or non-fired or operation. This potential for compressor surge had not been known or recognized by the industry.

It has now been recognized that a possible consequence of decreasing chargeflow demand during the onset of motoring events via cylinder deactivation is a phenomenon known as 'deceleration' compressor surge or 'decel' surge. For example, deactivating 3 of the 6 cylinders during the onset of motoring creates a flow restriction in the system in a manner similar to the impact of sudden throttle closure in a turbo-charged SI engine. The subsequent deceleration of the airflow moving through the intake manifold system will increase the intake manifold pressure (IMP) significantly. The combination of increased IMP (e.g. compressor outlet pressure) and reduction in airflow through the compressor can push the compressor into surge. Airflow through the compressor flows in reverse when this happens, halting rotation of the compressor and turbine as the intake tract empties. This severe form of surge is called deep deceleration compressor surge. Deep decel compressor surge can compromise the turbomachinery, resulting in loss of engine power and a nonfunctional turbocharger.

The inventive system and method use a multi-step process to avoid compressor surge. A first step is to detect or determine when compressor surge is a substantial risk. That may be done by using data from the ECU, such as a change in engine load, or by observing other characteristics such as changes in gas pedal position. Alternatively, the detection step may be accomplished by continuously calculating estimates of IMP under conditions of cylinder deactivation, and then comparing those estimates to information regarding the compressor surge conditions of the engine to determine whether deactivation of one or more cylinders can occur without presenting a risk of compressor surge.

A second step is to take action based on the determination of the detecting step. The second step may incorporate a fixed time delay to cylinder deactivation, or it may use the information obtained in the detecting step to implement cylinder deactivation in a manner effective for avoiding compressor surge.

As to methods for detecting the potential for compressor surge, information regarding engine load may be obtained from the engine control unit and may be used to initiate a surge-avoidance solution. For example, information regarding engine load is typically "known" by the ECU, and a protocol may be established to implement a surge-avoidance strategy when engine load transitions from, for example, 3 bar BMEP, to 0.5 bar BMEP, or from 4 bar BMEP to 0.0 bar BMEP, or at whatever values are selected.

Alternatively, conditions for potential compressor surge may be detected by calculating estimates of future intake manifold pressure, and then comparing those estimates to data indicating when compressor surge may occur. Forecasts of future IMP may be calculated using known engine characteristics (such as engine displacement, the number of cylinders that may be active or deactivated, the volumetric efficiency of the engine, and the volume of the intake tract), and detected or estimated engine operating parameters (such as mass flow rate of fresh air leaving the compressor, intake manifold pressure, engine speed, exhaust gas recirculation fraction, and intake manifold temperature). Those forecasts of IMP are then compared to data describing the conditions under which compressor surge may be expected to occur.

A preferred formula for estimating future IMP values if cylinders are deactivated is provided herein. The estimates generated by that formula are compared to a "compressor map," including a "surge line" that reflects when compressor surge may be expected in terms of pressure ratio, specifically $$\text{Pressure Ratio}\left(\frac{P_{IMP}}{P_{amp}}\right),$$

as a function of reduced mass flow, specifically $$\text{Reduced Mass Flow Rate}\left(\frac{kg \cdot \sqrt{N}}{kPa \cdot s}\right).$$

Figure 18:
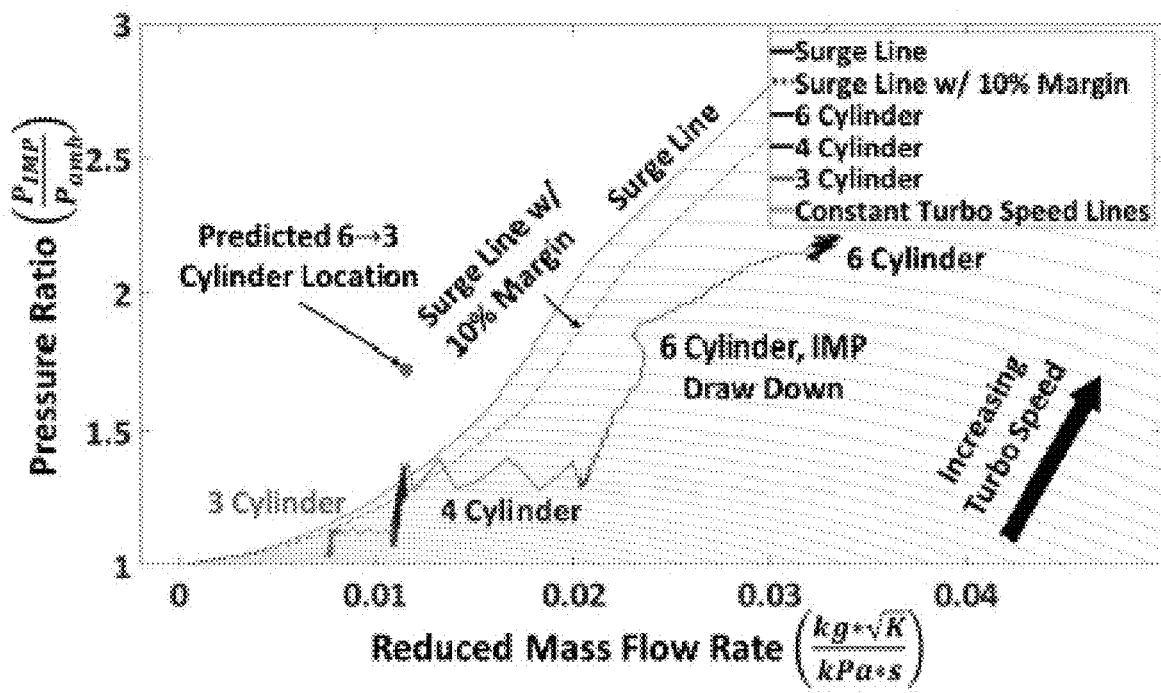
FIG. 18 shows a surge event with the inventive method being applied. Staged cylinder deactivation was deployed to avoid compressor surge.

One example of a compressor map showing a compressor surge line is provided in FIG. 18.

The compressor surge line is known for each specific model of engine, but in the prior art it has not been used to dynamically determine whether an engine was at risk of compressor surge. In the present invention, the compressor surge line is used as a tool for comparing against estimates of changes in intake manifold pressure for specific CDA conditions, and then for informing the decision as to how many cylinders can be deactivated to avoid compressor surge, and thus to move into cylinder deactivation as quickly as possible while avoiding compressor surge.

The compressor surge line may be used to provide data for a rule for when to implement a particular cylinder deactivation protocol. For example, a table may be created to compare compressor surge line data with information about the speed and load of the engine at a particular time. With this method, a rule may be established and implemented whereby, at a particular speed and load of the engine, a CDA delay of a set time, such as 0.5 seconds to 1.5 seconds, is used.

The determination of whether the engine is at risk of compressor surge, i.e., the determination of whether deactivation of one or more cylinders would move the engine over the surge line, may be accomplished by including a safety margin into the determination. Preferably, the determination includes a 10% safety margin to avoid compressor surge in engines that may deviate slightly from engines that perform precisely as predicted in the calculation.

Date for determining a compressor map (including surge line) data may be provided by the turbocharger manufacturer. The compressor map (including surge line) is specific to the turbocharger (i.e. different size or part-number turbos have different compressor maps, just as different size or make/model engines have different torque curves). The collection of points (provided by the turbocharger manufacturer in table format) which define the surge line must be converted into a "useful" format for the IMP forecasting module.

In one preferred embodiment a compressor map is created with the following method steps.

Step 1: Curve fit the data (collection of points) defining the surge line. Using a 6th order polynomial, Surge Line=Y $(x)=Ax^6+Bx^5+Cx^4+Dx^3+Ex^2+Fx+G$. As previously indicated, the coefficients A, B, C . . . G are unique to the turbocharger.

Step 2: Create a modified surge line, which includes a 10% safety margin (Surge Line w/10% Margin in plot above). Surge Line w/10% Margin=YMODIFIED(x)=A $(0.9x)^6+B(0.9x)^5+C(0.9x)^4+D(0.9x)^3+E(0.9x)^2+F(0.9x)+G$. Here too, the coefficients A, B, C . . . G are unique to the turbocharger.

Figure 10:
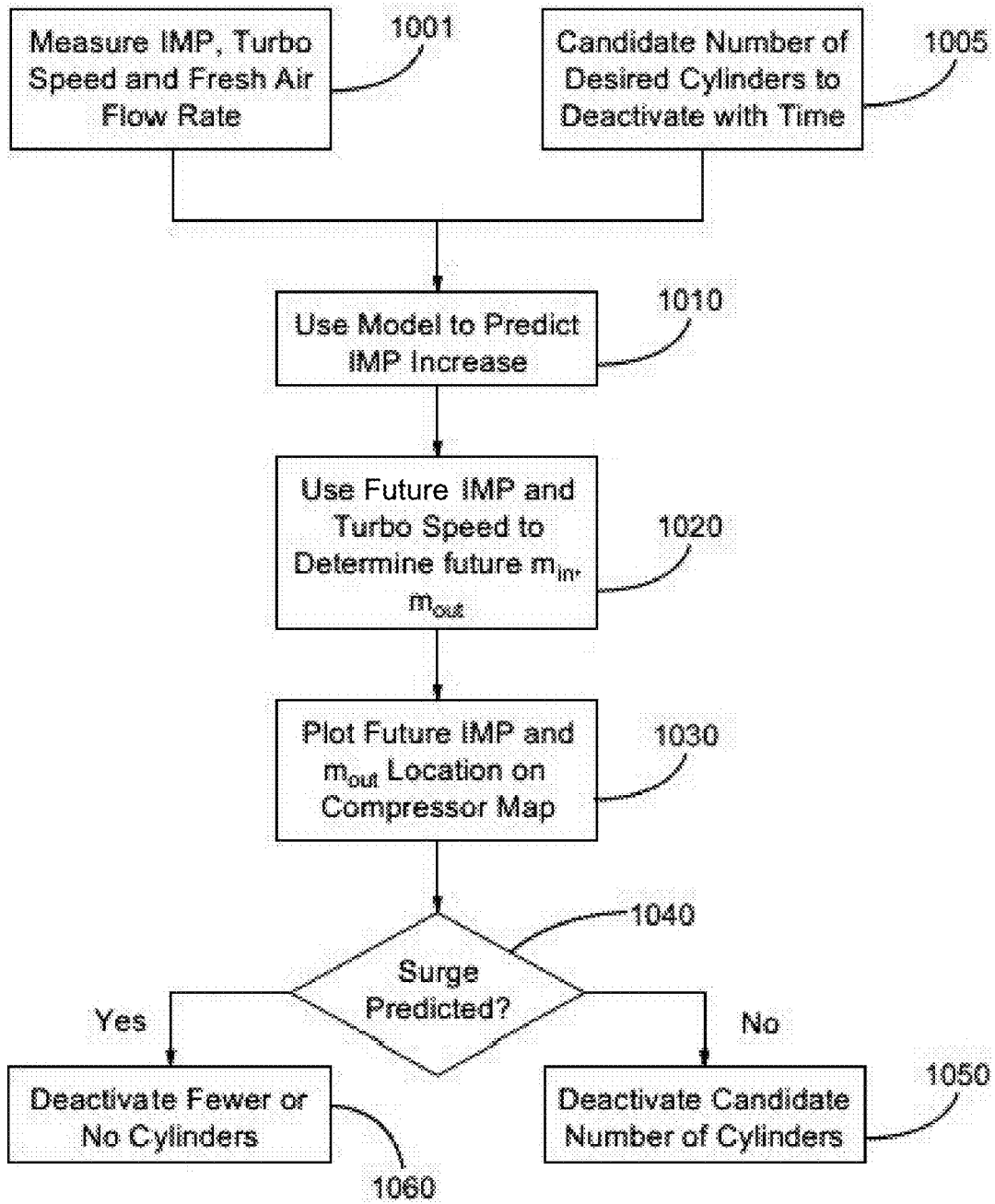
FIG. 10 shows a flow chart of certain aspects of the present invention, according to a second preferred embodiment.

Using the surge line (preferably with a 10% safety margin), predicted future IMPs may be plotted on the compressor map to determine whether there is a risk of compressor surge. For example, a comparison of the predicted future IMP (Normalized w/ $P_{amb}$)=$Y_{predicted}$ to the predicted future reduced-compressor-mass flow=$m_{out}$=$X_{predicted}$ may be used. If $Y_{MODIFIED}(X_{predicted})$>$Y_{predicted}$, no surge is predicted. However, If $Y_{MODIFIED}(X_{predicted})$<$Y_{predicted}$, then surge is predicted. The diagram of FIG. 5 shows this decision tree, and the flow chart of FIG. 10 shows one application of it.

As to the methods for avoiding compressor surge, a fixed time delay may be used. For example, a delay of 0.5 seconds to 3 seconds before implementation of CDA may be used to avoid compressor surge.

Alternatively, information regarding the compressor surge conditions of the engine may be used to determine when deactivation of one or more cylinders can occur without presenting a risk of compressor surge. With this method cylinder deactivation can be implemented in a manner effective for avoiding compressor surge.

In view of the above, it can be seen that one aspect of the present invention provides a method for detecting when a turbocharged diesel engine is at risk of compressor surge, and when that is the case, the inventive method delays part or all of the cylinder deactivation. In a related aspect, the present invention provides a method for detecting when cylinder deactivation may occur without presenting a risk of compressor surge, and then deactivates the greatest number of cylinders that may be deactivated without presenting a risk of compressor surge.

In one preferred embodiment the system continuously calculates estimates of IMP under conditions of cylinder deactivation and uses that information to cause the cylinder deactivation module to delay the deactivation of some cylinders when cylinder deactivation would otherwise occur. With this "staged deactivation" method, the greatest number of cylinders that may be deactivated are deactivated, and the system continues to calculate whether, and when, additional deactivation can occur. Accordingly, if cylinder deactivation from 6 cylinders to 2 cylinders, for example, is indicated by the cylinder deactivation module, but the compressor surge method of the present invention indicates that such deactivation may lead to compressor surge, the cylinder deactivation may occur as a series of deactivations from 6 active cylinders to 4 active cylinders, and then from 4 active cylinders to 2 active cylinders—thus accomplishing the desired cylinder deactivation while avoiding compressor surge. The timing of the sequence of staged cylinder deactivations is typically very short, such as on the order of five seconds or less.

The information and/or software necessary to implement the inventive method may be provided any place that allows the necessary calculations and that may communicate with the cylinder deactivation module. For example, a tangible memory device may be used to store the information and/or software needed to calculate estimates of the change in expected intake manifold pressure over time and/or to compare estimated values to acceptable intake manifold pressure values with respect to airflow, and to provide that information directly or indirectly to the cylinder deactivation module. Alternatively, the information and/or software necessary to implement the inventive method may be provided in the engine calibration and/or control systems.

As previously indicated, the set of steps used by the inventive method are intended to be effective for mitigating turbocharger compressor surge and associated loss of functionality during transition from elevated load operation with all cylinders activated to low load operation with one or more cylinders deactivated. One preferred set of steps performed by the inventive system and method includes:

i) measuring the intake manifold pressure of a turbocharged diesel engine;

ii) measuring the turbo speed of said turbocharged diesel engine;

iii) measuring the fresh air flow rate for intake air entering said turbocharged diesel engine;

iv) selecting a first desired number of cylinders potentially to deactivate in said turbocharged diesel engine, wherein said first desired number is less than n;

v) calculating a first estimate of the change in expected intake manifold pressure over time if the desired number of cylinders is deactivated;

vi) comparing the maximum intake manifold pressure of the first estimate to an acceptable intake manifold pressure to determine whether deactivating the desired number of cylinders would be expected to produce an unacceptable input manifold pressure at any relevant time subsequent to a deactivation of the desired number of cylinders;

vii) if the comparison of step (vi) indicates that deactivating the desired number of cylinders would not be expected to produce an unacceptable input manifold pressure at any relevant time, deactivating the desired number of cylinders on said turbocharged diesel engine;

viii) if the comparison of step (vi) indicates that deactivating the desired number of cylinders would be expected to produce an unacceptable input manifold pressure at any relevant time subsequent to a deactivation of the selected number of cylinders, reducing the desired number of cylinders to deactivate to a lower desired number of cylinders and repeating steps (vi), (vii) and (viii) until cylinders have been deactivated;

wherein each of said estimates of the change in expected intake manifold pressure over time is determined using the formula:

$$P_i + 1 = \frac{\dot{m}_{in} + \frac{P_i V_{intake}}{RT \Delta t}}{\frac{V_{disp} num_{cyc} \eta_{vol} RPM (1 - EGR_{frac})}{120\, RT} + \frac{V_{intake}}{RT\, \Delta T}}$$

where:

| Symbol | Description |
| --- | --- |
| $\dot{m}_{in}$ | Mass flow rate of fresh air leaving the compressor |
| $P_i$ | Intake Manifold Pressure at instant i |
| $V_{disp}$ | Displacement of the Engine |
| $num_{cyl}$ | Future Number of Active Cylinders |
| $\eta_{vol}$ | Volumetric Efficiency |
| RPM | Engine Speed |
| $EGR_{frac}$ | EGR Fraction (0 when motoring) |
| R | Universal Gas Constant |
| T | Universal Manifold Temperature |
| $V_{intake}$ | Volume of the Intake Tract |
| $\Delta t$ | Change in Time (0.1 s) |

Future outlet pressure may be determined iteratively using the formula shown above, with a 0.1 s time step up to 1 s in the future preferably being used.

A further aspect of the present invention is the diesel engine that comprises:

a) a multiplicity of cylinders;
b) an air intake;
c) an air intake manifold;
d) a compressor;
e) a turbine;
f) an engine control module (ECM); and
g) a cylinder deactivation (CDA) controller effective for controlling the deactivation of one or more cylinders, with the engine control module preferably being adapted to work with the CDA controller to delay the deactivation of said one or more cylinders upon detection of conditions under which the engine is at risk of compressor surge.

The components of the inventive system may work together to delay the deactivation for a set period of time upon detecting a risk for compressor surge, or they may delay the deactivation by performing a predetermined set of steps. In addition to or instead of the engine control module and/or the CDA controller, the system may also use a microcontroller to determine whether deactivating a desired or selected number of cylinders would be expected to produce unacceptable input manifold pressure, and subsequently to initiate cylinder deactivation. Preferably the mechanism for determining whether deactivating cylinders would be expected to produce unacceptable intake manifold pressure is incorporated into the engine's calibration system.

To validate the system and methods of the present invention a six-cylinder Cummins turbo-diesel engine equipped with a camless variable valve actuation (VVA) system was used. An alternating current dynamometer was coupled to the engine via a drive-shaft which allows for non-fueled rotation (motoring) of the engine, as is typical during vehicle coasting. The engine was equipped with a coolant-cooled high pressure exhaust gas recirculation (EGR) loop, an air-to-water charge-air-cooler (CAC), and variable geometry turbocharger (VGT).

The engine's gas exchange pathways are shown in FIG. 1. Air filter 110 filters fresh air before passing it on the laminar flow element ("LFE") 120 and compressor 130. The air travels to cylinder block 150, entering through intake manifold 151 and exiting through exhaust manifold 152. After leaving the cylinders, the air is directed to turbine 160. Pressures are recorded at the engine air filter 110, compressor inlet 131, compressor outlet 132, CAC inlet 141 and outlet 142, and intake manifold 151. Temperatures are recorded at the same locations.

Several exemplary sensors can comprise one or more combinations of a mass air flow sensor ("MAF"), differential pressure sensor (Delta_P_sensor), air pressure sensor, boost sensor, temperature sensor, speed sensor such as Hall effect sensor, valve position sensors, oxygen sensors, among others. Upgrades from the test cell shown in FIG. 1 can be made for on-road vehicle use. For example, the laminar flow element (LFE) can be replaced with another air flow sensor, such as a MAF sensor. Equivalent and alternative sensors are intended within the scope of the disclosure. While direct sensing is one way of achieving values such as the mass flow rate of fresh air, IMP, engine speed, EGR fraction, and intake manifold temperature, these values can alternatively be estimated. Means for estimating can comprise a combination of direct measurements and stored, processed algorithms to solve for or derive the estimations. For example, a speed-density calculation can be used for estimating air mass flow rate. Equivalent and alternative estimations are intended within the scope of the disclosure.

Figure 3:
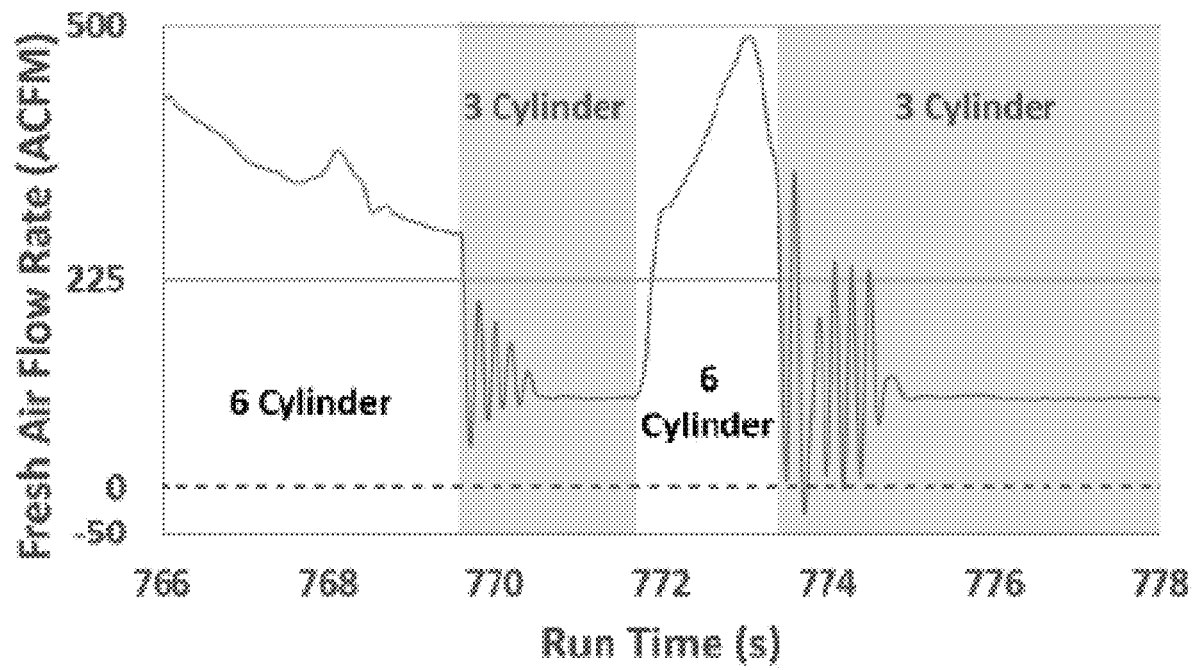
FIG. 3 shows engine airflow measurements over a portion of the HD-FTP detailing negative and oscillatory (surging) airflow after entering 3 CDA (gray region).
Figure 4:
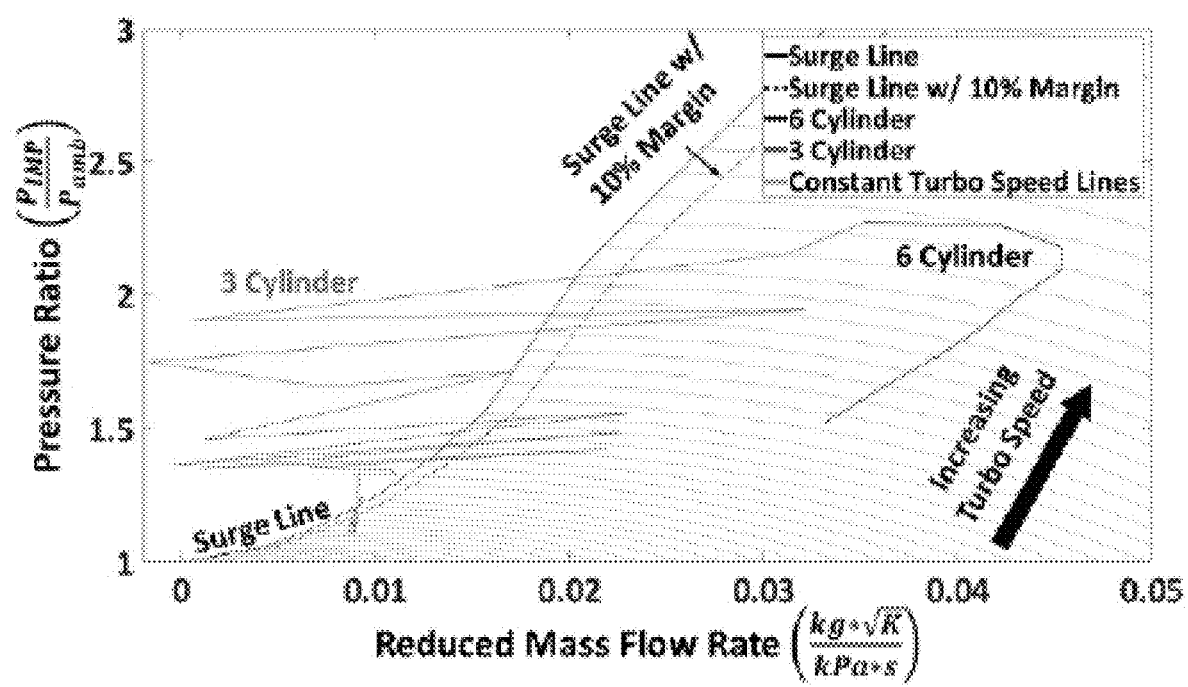
FIG. 4 shows the surge data from FIG. 4 plotted on the compressor map, showing rapid fluctuations in airflow, IMP and turbo speed.

Operating with fewer active cylinders during motoring or low load events reduces the airflow through the aftertreatment system, improving thermal management. However, compressor surge can result from the subsequent increase in compressor outlet pressure and decrease in compressor airflow. As an example, consider the experimental air flow data plotted in FIG. 3. In this figure, the gray region indicates a motoring section of the drive-cycle, during which 3 CDA is implemented following high engine load operation. CDA terminates fuel injection to the cylinders and ceases valve motion so that intake and exhaust valves are closed. "3 CDA" on a 6-cylinder engine means that 3 cylinders have no fuel and no valve motion while the remaining 3 cylinders have fueling and valve opening and closing. CDA can be used on valvetrains with other variable valve actuation ("VVA") techniques enabled, such as engine braking or early or late valve opening or closing techniques. The sudden reduction in displaced cylinder volume resulting from cylinder deactivation results in compressor operation past the surge line as shown in FIG. 4, whereby compressor flow reverses and oscillates. The compressor shaft speed decreased from 95,000 to 0 RPM within 0.1 seconds and air flow reversed through the LFE, as shown via the negative airflow at the 774 second mark.

As previously indicated, one method to avoid deep decel compressor surge would be to wait a fixed amount of time for IMP to decrease to near atmospheric conditions before transitioning to 3 CDA. An alternative method is to deactivate cylinders as soon as it is predicted that surge would be avoided. To accomplish this, three variables require prediction: i) the future IMP increase resulting from the reduction in engine charge flow into the reduced number of active cylinders (FIG. 7), ii) future compressor air flow, and iii) location of the predicted IMP and mass flow relative to the compressor surge line.

The future compressor mass air flow is predicted iteratively via the compressor map. Using the inputs of measurable turbo speed (assumed constant) and predicted future IMP, the output from the compressor map lookup table provides the estimates of future compressor mass flow. Turbo speed will decrease slightly during motoring and low load events, but can be assumed to be constant to simplify the model. This also provides a slight safety margin by slightly over-predicting the IMP increase. Rearranging the conservation of mass equations, Equations and a pressure prediction can be made via the equation below. Future compressor outlet pressure is determined iteratively with a 0.1 s time step up.

$$P_i + 1 = \frac{\dot{m}_{in} + \frac{P_i V_{intake}}{RT \Delta t}}{\frac{V_{disp} num_{cyc} \eta_{vol} RPM(1 - EGR_{frac})}{120 RT} + \frac{V_{intake}}{RT \Delta T}}$$

where:

| Symbol | Description |
|---|---|
| $\dot{m}_{in}$ | Mass flow rate of fresh air leaving the compressor |
| $P_i$ | Intake Manifold Pressure at instant i |
| $V_{disp}$ | Displacement of the Engine |
| $num_{cyl}$ | Future Number of Active Cylinders |
| $\eta_{vol}$ | Volumetric Efficiency |
| RPM | Engine Speed |
| $EGR_{frac}$ | EGR Fraction (0 when motoring) |
| R | Universal Gas Constant |
| T | Universal Manifold Temperature |
| $V_{intake}$ | Volume of the Intake Tract |
| $\Delta t$ | Change in Time (0.1 s) |

Future engine mass airflow is predicted using the engine mass flow equation with the predicted IMP and planned number of activated cylinders. The future predictions of compressor air flow and IMP are then plotted on the compressor map, shown in FIG. 9, and the distance from the surge line is determined via a square root of the sum of the squares. Compressor mass flow is predicted using a lookup table (the compressor map) with inputs of predicted IMP+ turbo speed. The algorithm follows the logic in the flow chart shown in FIG. 10.

Figure 9:
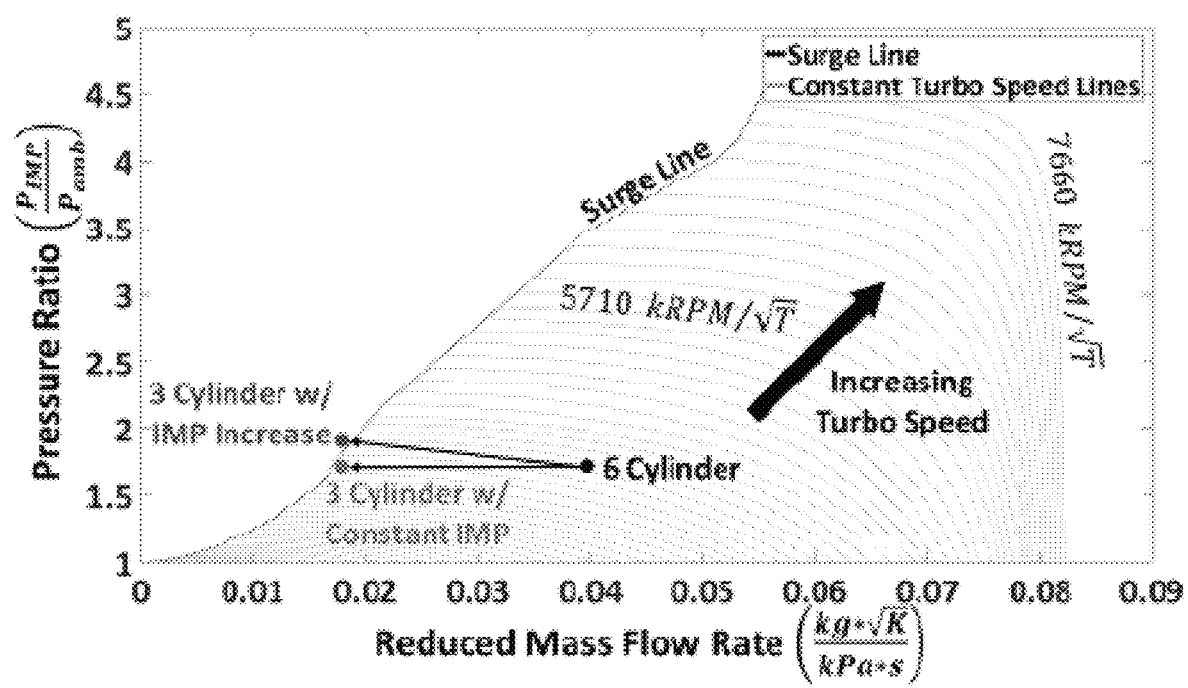
FIG. 9 shows how the increase in IMP triggered by deactivating cylinders may push the future location over the surge line, and thus must be considered.

The IMP increase following the onset of CDA during motoring must be considered because the higher pressure will push the future compressor map location closer to or over the surge line. Assuming that IMP remains constant (no increase) after deactivating cylinders would not accurately predict the onset of surge. This is shown in FIG. 9.

Figure 11:
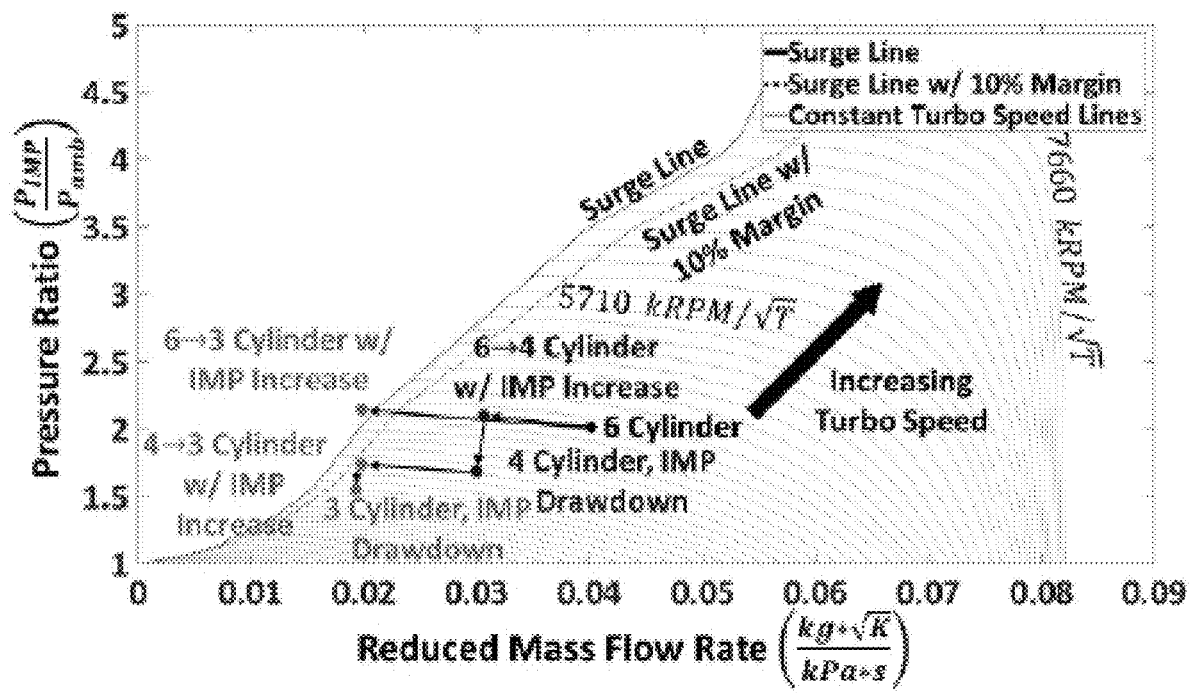
FIG. 11 shows a staged CDA strategy (6-4-3) reduces the magnitude of the IMP increase and avoids decel compressor surge caused by 6 cylinders to 3 CDA.

A surge margin of 10% is preferably used to account for the pulsating nature of fresh airflow. and to account for imprecision in the surge line. The surge and "margin added" surge lines are shown in FIG. 11. This figure also illustrates how the proposed algorithm avoids surge. The magnitude of the IMP increase generally scales with the percentage reduction in airflow, thus stepping from 6 active cylinders to 4 active cylinders (2 CDA) reduces airflow by ⅓rd, while stepping from 6 to 3 active cylinders (3 CDA) reduces airflow by ½. Larger stepped reductions in airflow yield a larger IMP increase, which could result in compressor surge.

While the formula above discloses a preferred method for determining when compressor surge may occur, other formulas may also be used. For example, air mass flow rate and intake manifold pressure may be used without measuring or estimating the engine speed, and/or without measuring or estimating the exhaust gas recirculation fraction, and/or without measuring or estimating the intake manifold temperature.

Figures 6, 7:
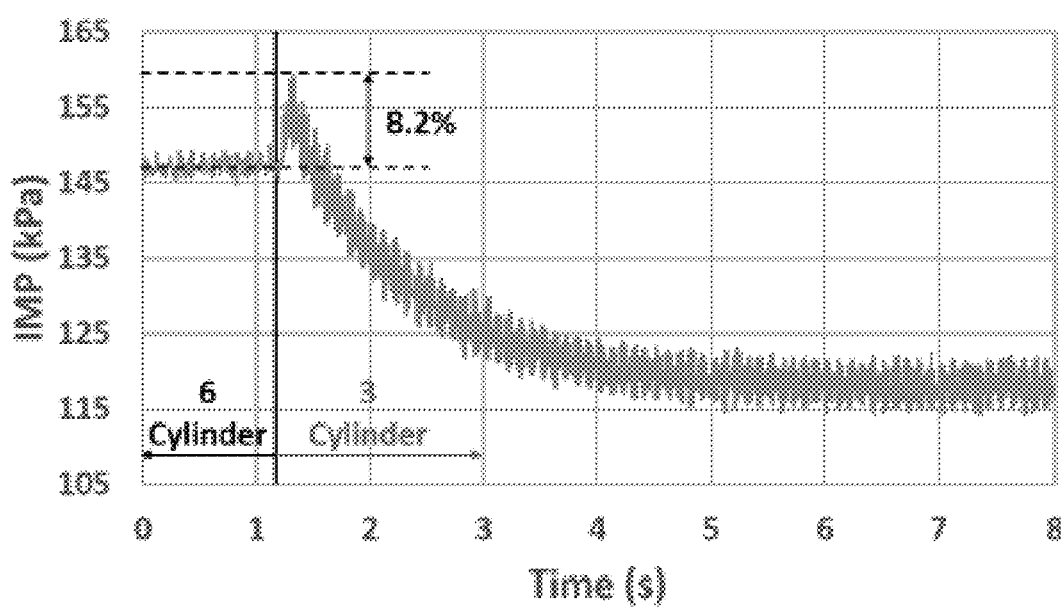
FIG. 6 shows a flow chart of certain aspects of the present invention, according to one preferred embodiment.
FIG. 7 shows an example of IMP increase upon deactivation from 6-cylinder to 3-cylinder operation at 1.26 s at 2200 RPM and 1.27 bar BMEP.
Figure 8:
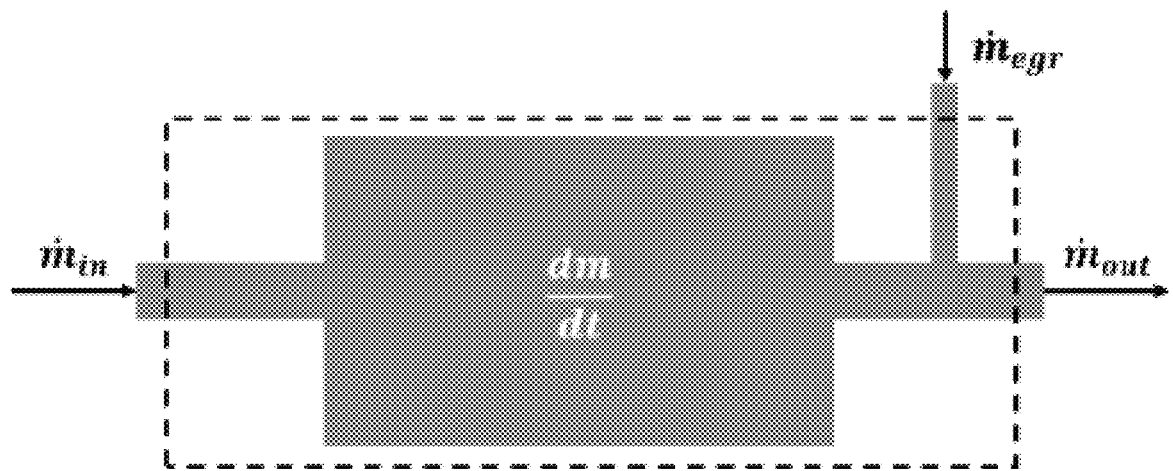
FIG. 8 shows intake tract control volume over which certain aspects of the present invention are applied.
Figure 12:
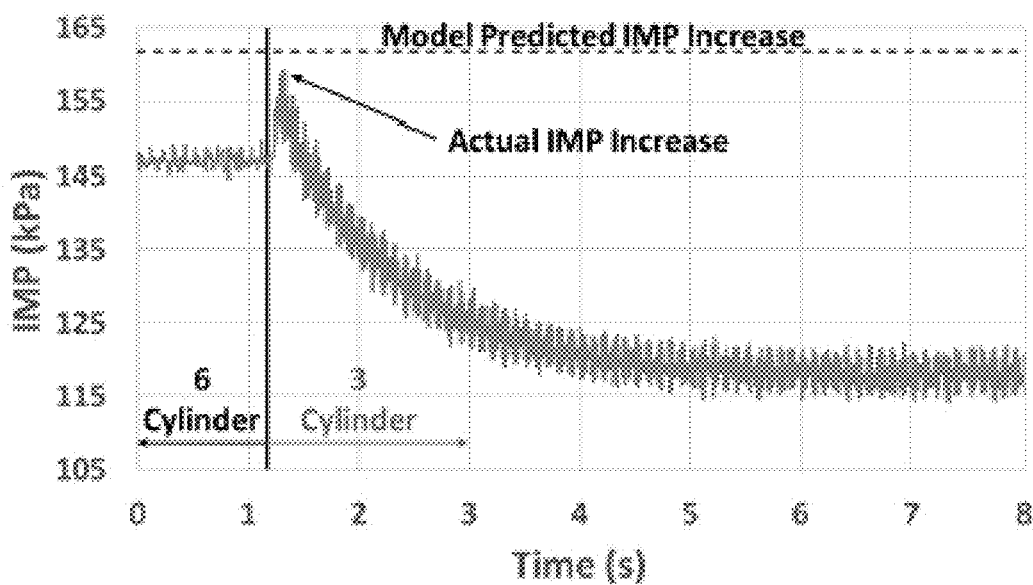
FIG. 12 shows that the inventive method accurately predicts the IMP increase upon deactivating from 6 to 3 cylinders at 1.2 s, which was previously shown in FIG. 7.

The inventive method was verified using experimental data corresponding to a variety of initial conditions and number of deactivated cylinders. For example, FIG. 7 shows an example of IMP increase upon deactivation from 6-cylinder to 3-cylinder operation at 1.26 s at 2200 RPM and 1.27 bar BMEP, and FIG. 12 shows how the predicted IMP values compare to that data. As can be seen from the Figures, the model accurately captures the physics of the IMP increase, thus allowing the inventive system and method to improve the functioning of the engine.

After validating the model, it was applied with staged cylinder deactivation to prevent compressor surge in two different cases: i) 1600 RPM/25% accelerator position to 1600 RPM/motoring; and ii) 200 ORPM/71% accelerator position to 2000 RPM/motoring. The former was used to confirm transient application of the inventive method at a lower engine speed and load, and the latter to emulate a section of the HD-FTP where deep decel compressor surge was previously seen.

Figure 13:
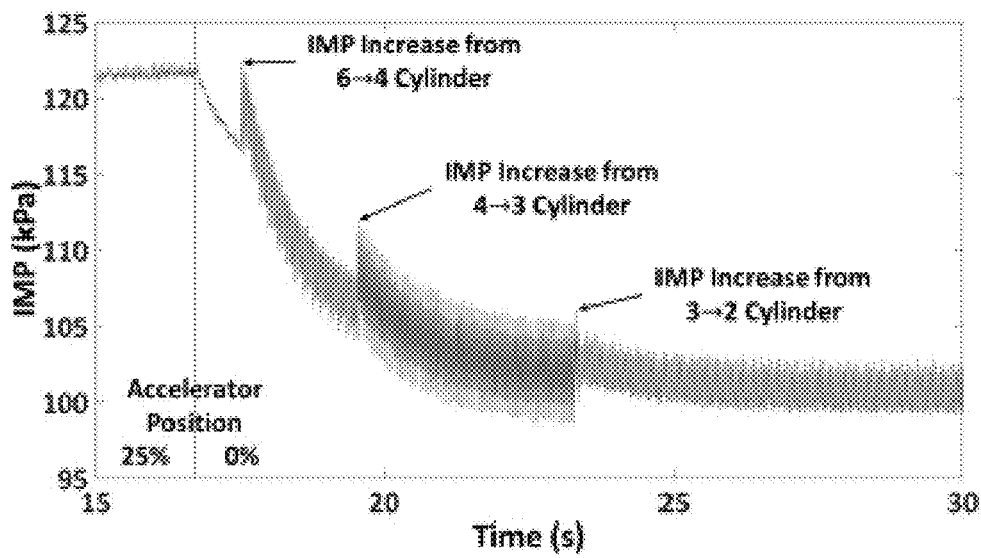
FIG. 13 shows experimental IMP (1600 RPM/0.44 bar BMEP) when accelerator position snaps from 25% to 0%.
Figure 14:
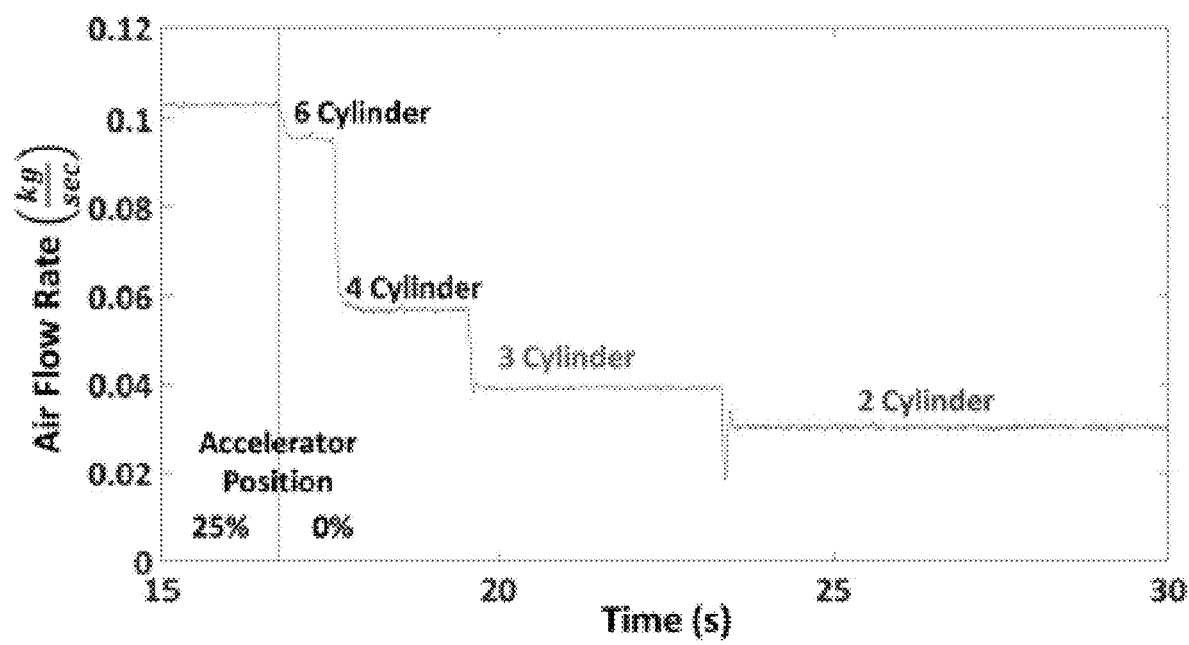
FIG. 14 shows experimental fresh airflow (1600 RPM/ 0.44 bar BMEP) when accelerator position snaps from 25% to 0%, staged cylinder deactivation reduces airflow and avoids surge.
Figure 15:
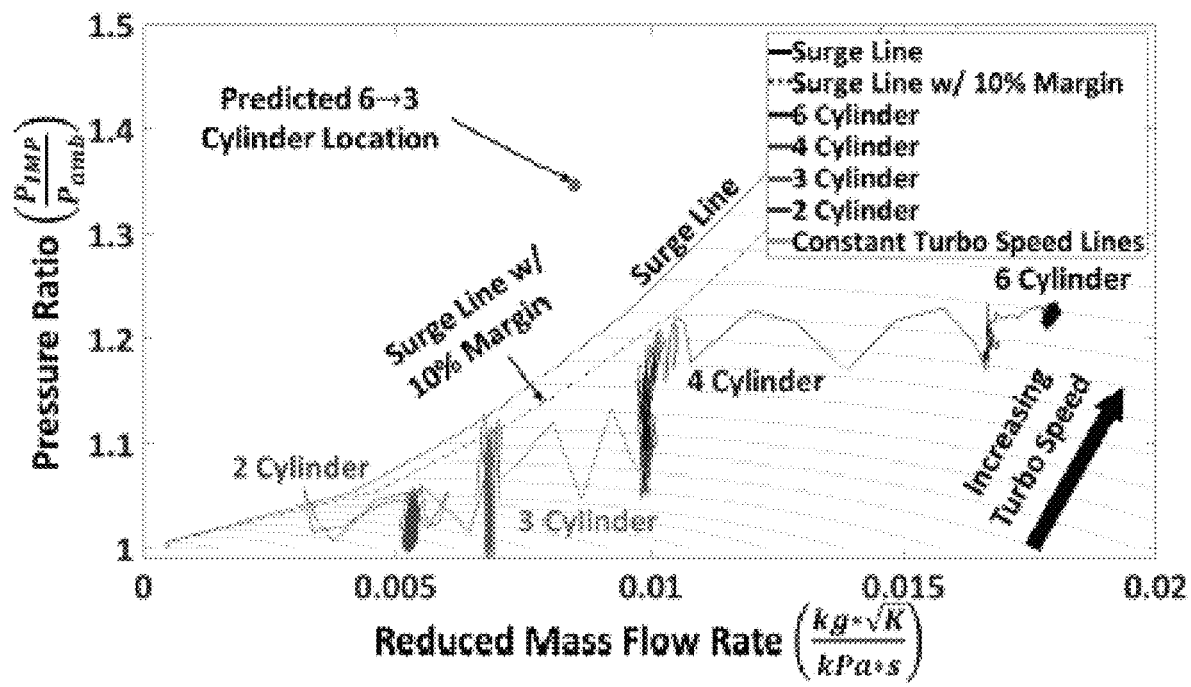
FIG. 15 shows results overlaid on a compressor map (1600 RPM/0.44 bar BMEP) when accelerator position snaps from 25% to 0%, demonstrating that staged cylinder deactivation successfully avoids compressor surge.

Low Load Results. Transient testing was performed at a condition of 1600 RPM and 25% accelerator position, where the engine is loaded at 0.44 bar BMEP. In this test, accelerator position is held constant at 25% until IMP and engine mass flow (as measured by the LFE) stabilize. At which point, the accelerator position changes to 0% (motoring) and the inventive set of steps is applied to deactivate cylinders and avoid surge. Engine speed was held constant throughout the test. The measured IMP, fresh airflow, and number of deactivated cylinders are shown in FIGS. 13, 14, and 15.

Surge is avoided by the system and methods of the present invention, as desired. The control strategy maintained 6 cylinder operation for roughly 0.5 seconds before transitioning to 4 cylinder operation (2 CDA) for about 1 second, then into 3 cylinder operation (3 CDA) for 2 seconds. As described previously, the delay in cylinder deactivation, and staging from 6 to 4 to 3 to 2 activated cylinders, was necessary to allow for the IMP increase to reduce enough to avoid compressor surge. The 6-cylinder engine in this example can step from zero CDA, to 2 CDA, to 3 CDA, to 4 CDA. All cylinder CDA (6 CDA) is a scenario with all cylinders deactivated.

High Load Results. Transient testing of the inventive system and method was also performed from a condition of 2000 RPM and 71% accelerator position, where the engine is loaded at 13.0 bar BMEP. In this test, accelerator position was held constant at 71% until IMP and engine mass flow (as measured by the LFE) stabilized. The accelerator position was then changed to 0% (motoring) and the inventive method was applied to deactivate cylinders and avoid surge in the same manner as before. This test reproduces a segment of the HD-FTP where deep decel compressor surge had occurred previously.

Figure 16:
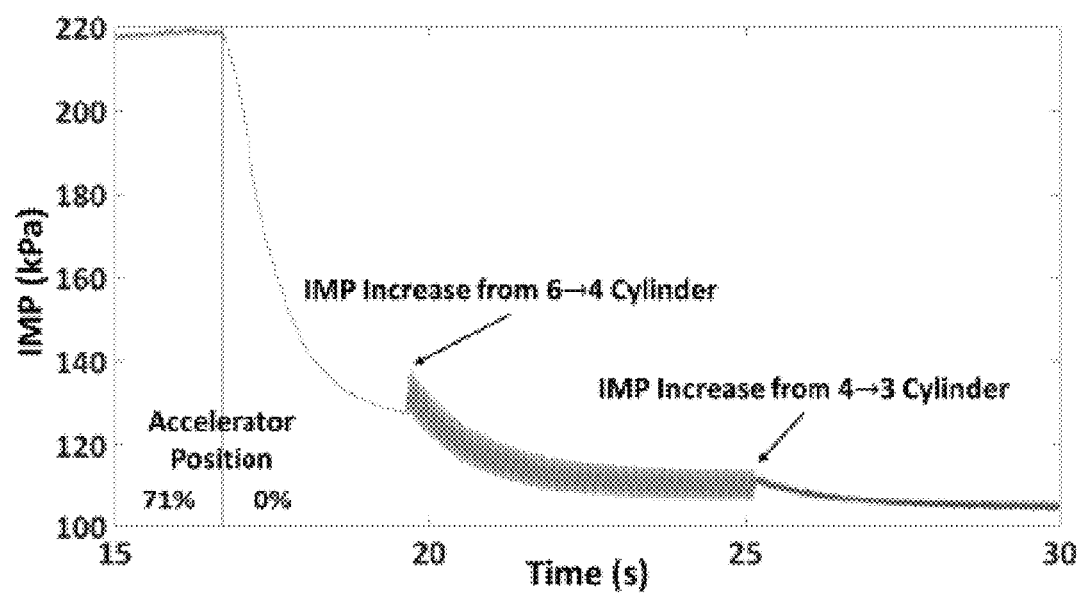
FIG. 16 shows experimental IMP (2000 RPM/13.0 bar BMEP) when accelerator position snaps from 71% to 0%, the future IMP prediction model accurately predicts the IMP increase.
Figure 17:
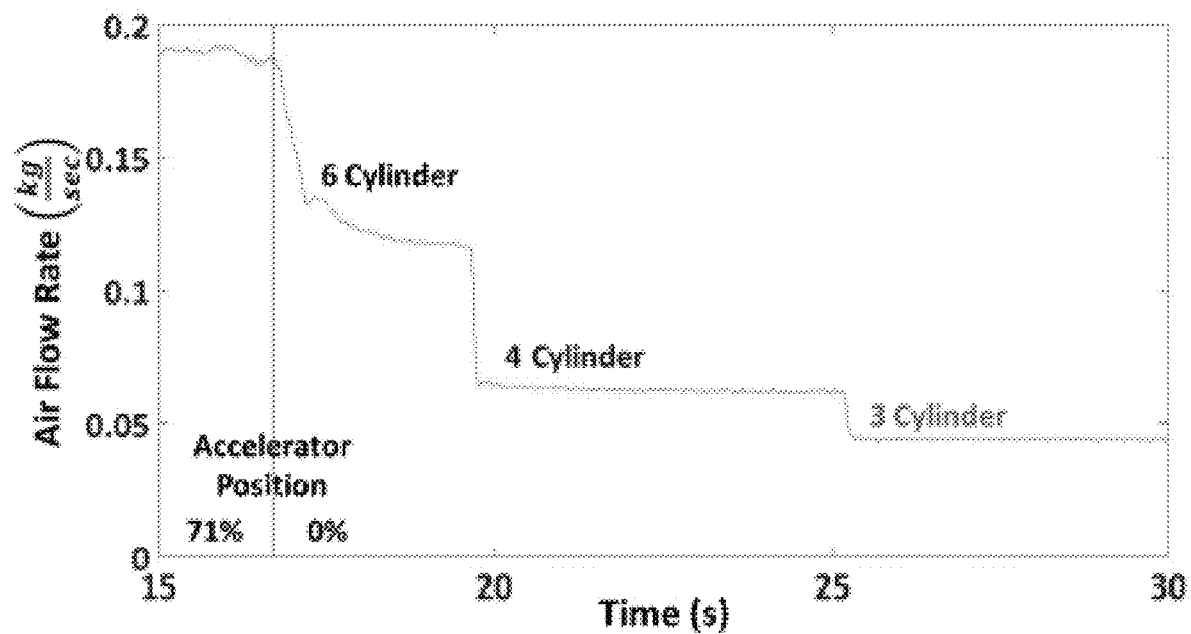
FIG. 17 shows experimental fresh airflow (2000 RPM/ 13.0 bar BM EP) when accelerator position snaps from 71% to 0%, staged cylinder deactivation reduces airflow while avoiding negative airflow (surge).

Specifically, the measured IMP, fresh airflow, and number of deactivated cylinders are shown in FIGS. 16 and 17. The test showed that the inventive method accurately predicts the IMP increase associated with cylinder deactivation as indicated by how closely conditions at the compressor outlet come to the surge line, shown in FIG. 18 without crossing it. The inventive method held constant the number of active cylinders for the appropriate amount of time to avoid compressor surge. The controller did not allow for deactivation down to the minimum capability of two active cylinders because it predicted a location to the left of the surge line at these engine operating conditions.

FIG. 18 shows the surge avoidance method implemented at 2000 RPM and 71 to 0% accelerator position change overlaid on the compressor map. The estimate provided by the inventive method indicated that a transition directly from 6 to 3 active cylinders would instigate compressor surge, and therefore the method caused the engine to remain in 6 cylinder operation until IMP decreased sufficiently, before switching to 4 cylinders and eventually 3. In this case, 2 cylinder operation was never reached because it would have been to the left of the surge line, albeit at atmospheric pressure. When the intake manifold pressure is at or near ambient pressure operating to the left of the surge line does not compromise the functionality of the turbocharger due to the lack of a deltaP or reverse airflow across the compressor wheel.

The inventive method provided staged cylinder deactivation that successfully avoided surge during the motoring segment of the HD-FTP, and in so doing allowed for the fastest possible deactivation of cylinders without compromising the turbomachinery.

In the aspects of the invention described above, the disclosed method has been used primarily avoid compressor surge when transitioning from high load operation to non-fired operation. In addition to that situation, the disclosed method may also be used to avoid compressor surge when transitioning from high load operation to idle or low load operation, such as operation at less than 0.5 bar BMEP. In the context of these aspects of the invention, high load operation is generally expected to be about 3 bar BMEP, and is preferably above about 4 bar BMEP.

Further discussion of the principles and embodiments of the present invention are disclosed in applicant's U.S. Provisional Patent Application No. 62/635,441, filed 26 Feb. 2018, the entire contents of which is hereby incorporated herein by reference.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the described or illustrated features. For example, the present invention includes devices and methods comprising any or all of the features described or illustrated in specification or drawings, and the present invention includes devices and methods consisting essentially of any or all of the features illustrated in the specification or drawings. Additionally, any or all of the features and/or embodiments disclosed herein may be combined with any or all of the other features and/or embodiments disclosed herein to provide a device or method that comprises or consists essentially of such features.

Finally, the grammatical device "and/or" (such as in "A and/or B") is used in this disclosure to mean A alone, or B alone, or both A and B.

The invention claimed is:

1. A method for improving the functioning of a turbocharged diesel engine equipped with a cylinder deactivation system, the method comprising detecting when the turbocharged diesel engine is at risk of compressor surge, and then delaying part or all of the cylinder deactivation until risk of compressor surge is not indicated;

wherein said detecting is accomplished by calculating estimates of changes in intake manifold pressure (IMP) for specific cylinder deactivation (CDA) conditions, and then comparing those estimates to the compressor surge line for the engine to determine whether deactivation of one or more cylinders will avoid compressor surge;

wherein said estimates are calculated by a set of steps comprising:
a) measuring or estimating the mass flow rate of fresh air leaving the compressor of a turbocharged diesel engine having n cylinders;
b) measuring or estimating the intake manifold pressure of said engine;
c) providing information indicating the displacement of the engine, the future number of active cylinders, and the volumetric efficiency of the engine;
d) using the mass flow rate information, the intake manifold pressure information, the engine displacement information, and the volumetric efficiency information to estimate changes in intake manifold pressures over time if some or all engine cylinders are deactivated;
e) comparing the intake manifold pressure estimates to acceptable intake manifold pressure information to determine whether deactivating cylinders would be expected to produce an unacceptable intake manifold pressure at any relevant time subsequent to a cylinder deactivation; and
f) if the comparison of step (e) indicates that one or more cylinders could be deactivated without being expected to produce an unacceptable intake manifold pressure at any relevant time, deactivating the greatest number of cylinders that may be deactivated without producing an unacceptable intake manifold pressure.

2. A method according to claim 1 wherein the method further includes moving into cylinder deactivation as quickly as possible while avoiding compressor surge.

3. A method according to claim 1 wherein said estimates are calculated by a set of steps comprising:
a) measuring, or calculating from known parameters, the mass flow rate of fresh air leaving the compressor of the engine;
b) measuring the intake manifold pressure of the engine;
c) measuring the engine speed of the engine;
d) measuring the exhaust gas recirculation fraction of the engine; and
e) measuring the intake manifold temperature of the engine;
f) providing information indicating the displacement of the engine, the future number of active cylinders, the volumetric efficiency of the engine, and the volume of the intake tract;
g) using the mass flow rate information, the intake manifold pressure information, the engine speed information, the exhaust gas recirculation fraction information, the intake manifold temperature information, the engine displacement information, the volumetric efficiency information, and the intake tract volume information to estimate changes in intake manifold pressures over time if some or all engine cylinders are deactivated;
h) comparing the intake manifold pressure estimates to acceptable intake manifold pressure information to determine whether deactivating cylinders would be expected to produce an unacceptable intake manifold pressure at any relevant time subsequent to a cylinder deactivation; and
i) if the comparison of step (h) indicates that one or more cylinders could be deactivated without being expected to produce an unacceptable intake manifold pressure at any relevant time, deactivating the greatest number of cylinders that may be deactivated without producing an unacceptable intake manifold pressure;

wherein each of said estimates of the change in expected intake manifold pressure over time is determined using the formula:

$$P_i + 1 = \frac{m_{in} + \frac{P_i V_{intake}}{RT \, \Delta t}}{\frac{V_{disp} num_{cyc} \eta_{vol} RPM (1 - EGR_{frac})}{120 \, RT} + \frac{V_{intake}}{RT \, \Delta T}}$$

where:

| Symbol | Description |
| --- | --- |
| $m_{in}$ | Mass flow rate of fresh air leaving the compressor |
| $P_i$ | Intake Manifold Pressure at instant i |
| $V_{disp}$ | Displacement of the Engine |
| $num_{cyl}$ | Future Number of Active Cylinders |
| $\eta_{vol}$ | Volumetric Efficiency |
| RPM | Engine Speed |
| $EGR_{frac}$ | EGR Fraction (0 when motoring) |
| R | Universal Gas Constant |
| T | Universal Manifold Temperature |
| $V_{intake}$ | Volume of the Intake Tract |
| $\Delta t$ | Change in Time (0.1 s) |

4. A method according to claim 1 wherein the engine cylinder deactivation occurs as a series of individual cylinder deactivations until an appropriate number of engine cylinders have been deactivated.

5. A method according to claim 4 wherein the method comprises:
detecting when the turbocharged diesel engine is at risk of compressor surge by calculating a first set of estimates of changes in intake manifold pressures over time;
comparing the first set of estimates to information regarding the compressor surge conditions of the engine to determine whether deactivation of one or more cylinders will avoid compressor surge;
implementing a first stage of cylinder deactivations;
subsequently detecting when the turbocharged diesel engine is at risk of compressor surge by calculating second estimates of changes in intake manifold pressures over time;
comparing those estimates to information regarding the compressor surge conditions of the engine to determine whether deactivation of one or more cylinders will avoid compressor surge;
implementing a second stage of cylinder deactivations.

6. A method according to claim 4 wherein said detecting is accomplished by:

a) continuously calculating estimates of IMP under conditions of cylinder deactivation;
b) comparing those estimates to information regarding the compressor surge conditions of the engine to determine whether deactivation of one or more cylinders can occur without presenting a risk of compressor surge;
c) using information developed by that comparison determine whether the deactivation of one or more cylinders should occur or be delayed;
d) causing the cylinder deactivation module to deactivate the greatest number of cylinders that can be deactivated without presenting a risk of compressor surge;
e) continuing to calculate estimates of IMP under conditions of cylinder deactivation;
f) comparing those estimates to information regarding the compressor surge conditions of the engine to determine whether deactivation of one or more additional cylinders can occur without presenting a risk of compressor surge;
g) using information developed by that comparison determine whether the deactivation of one or more additional cylinders can occur or should be delayed;
h) causing the cylinder deactivation module to deactivate the greatest number of cylinders that can be deactivated without presenting a risk of compressor surge.

7. A method according to claim 1 wherein said detecting step is accomplished by detecting when the engine is transitioning from a high-load engine operation above 3 bar brake mean effective pressure (BMEP) to a non-fired engine operation.

8. A method according to claim 1 wherein said detecting step is accomplished by detecting when the engine is transitioning from a high-load engine operation above 3 bar brake mean effective pressure (BMEP) to a low-load engine operation below 0.5 bar BMEP.

9. A method according to claim 1 wherein said delaying step is for a fixed period of time.

10. A method according to claim 9 wherein the fixed time is calculated from information about the current speed and load conditions of the engine.

11. A method according to claim 9 wherein the fixed time is calculated using the compressor surge line of the engine.

12. A method according to claim 9 wherein said fixed time is between 0.5 seconds and 3 seconds.

13. A turbocharged diesel engine, comprising:
a) a plurality of cylinders;
b) an air intake;
c) an air intake manifold;
d) a compressor;
e) a turbine;
f) an engine control module (ECM); and
g) a cylinder deactivation (CDA) controller effective for controlling the deactivation of one or more cylinders;
wherein the engine control module is adapted to calculate estimates of changes in intake manifold pressure (IMP) for specific CDA conditions, and then to compare those estimates to the compressor surge line for that engine to determine whether deactivation of one or more cylinders will avoid compressor surge, and then to move into cylinder deactivation as quickly as possible while avoiding compressor surge;
wherein said estimates are calculated by a set of steps comprising:
a) measuring or estimating the mass flow rate of fresh air leaving the compressor of a turbocharged diesel engine having n cylinders;
b) measuring or estimating the intake manifold pressure of said engine;
c) providing information indicating the displacement of the engine, the future number of active cylinders, and the volumetric efficiency of the engine;
d) using the mass flow rate information, the intake manifold pressure information, the engine displacement information, and the volumetric efficiency information to estimate changes in intake manifold pressures over time if some or all engine cylinders are deactivated;
e) comparing the intake manifold pressure estimates to acceptable intake manifold pressure information to determine whether deactivating cylinders would be expected to produce an unacceptable intake manifold pressure at any relevant time subsequent to a cylinder deactivation; and
f) if the comparison of step (e) indicates that one or more cylinders could be deactivated without being expected to produce an unacceptable intake manifold pressure at any relevant time, deactivating the greatest number of cylinders that may be deactivated without producing an unacceptable intake manifold pressure.

14. A turbocharged diesel engine according to claim 13 wherein the engine additionally comprises:
a sensor or system for measuring, or system for calculating from known parameters, the mass flow rate of fresh air leaving the compressor of the engine;
a sensor for measuring the intake manifold pressure of the engine;
a sensor or system for measuring the engine speed of the engine;
a sensor or system for measuring the exhaust gas recirculation fraction of the engine; and
a sensor for measuring the intake manifold temperature of the engine;
information storage effective for storing information comprising: i) the displacement of the engine, ii) the volumetric efficiency of the engine, and iii) the volume of the intake tract.

15. A turbocharged diesel engine according to claim 13 wherein said estimates are calculated by performing a set of steps, comprising:
a) measuring or calculating from known parameters the mass flow rate of fresh air leaving the compressor of the engine;
b) measuring the intake manifold pressure of the engine;
c) measuring the engine speed of the engine;
d) measuring the exhaust gas recirculation fraction of the engine;
e) measuring the intake manifold temperature of the engine;
f) providing information indicating the displacement of the engine, the future number of active cylinders, the volumetric efficiency of the engine, and the volume of the intake tract;
g) using the mass flow rate information, the intake manifold pressure information, the engine speed information, the exhaust gas recirculation fraction information, the intake manifold temperature information, the engine displacement information, the volumetric efficiency information, and the intake tract volume information to estimate changes in intake manifold pressures over time if 0 to n engine cylinders are deactivated;
h) comparing the intake manifold pressure estimates to acceptable intake manifold pressure information to determine whether deactivating cylinders would be expected to produce an unacceptable intake manifold pressure at any relevant time subsequent to a cylinder deactivation; and
i) if the comparison of step (f) (h) indicates that one or more cylinders could be deactivated without being expected to produce an unacceptable intake manifold pressure at any relevant time, deactivating the greatest number of cylinders that may be deactivated without producing an unacceptable intake manifold pressure;

wherein each of said estimates of the change in expected intake manifold pressure over time is determined using the formula:

$$P_i + 1 = \frac{m_{in} + \frac{P_i V_{intake}}{RT \Delta t}}{\frac{V_{disp} num_{cyc} \eta_{vol} RPM (1 - EGR_{frac})}{120\ RT} + \frac{V_{intake}}{RT \Delta T}}$$

where:

| Symbol | Description |
| --- | --- |
| $m_{in}$ | Mass flow rate of fresh air leaving the compressor |
| $P_i$ | Intake Manifold Pressure at instant i |
| $V_{disp}$ | Displacement of the Engine |
| $num_{cyl}$ | Future Number of Active Cylinders |
| $\eta_{vol}$ | Volumetric Efficiency |
| RPM | Engine Speed |
| $EGR_{frac}$ | EGR Fraction (0 when motoring) |
| R | Universal Gas Constant |
| T | Universal Manifold Temperature |
| $V_{intake}$ | Volume of the Intake Tract |
| $\Delta t$ | Change in Time (0.1 s) |

16. A turbocharged diesel engine according to claim 13 wherein the engine cylinder deactivation comprises:
    detecting when the turbocharged diesel engine is at risk of compressor surge by calculating a first set of estimates of changes in intake manifold pressures (IMP) over time;
    comparing the first set of estimates to information regarding the compressor surge conditions of the engine to determine whether deactivation of one or more cylinders will avoid compressor surge;
    implementing a first stage of cylinder deactivations;
    subsequently detecting when the turbocharged diesel engine is at risk of compressor surge by calculating second estimates of changes in intake manifold pressures over time;
    comparing those estimates to information regarding the compressor surge conditions of the engine to determine whether deactivation of one or more cylinders will avoid compressor surge;
    implementing a second stage of cylinder deactivations.
17. A turbocharged diesel engine according to claim 13 wherein the engine cylinder deactivation occurs as a series of individual cylinder deactivations until an appropriate number of engine cylinders has been deactivated.
18. A turbocharged diesel engine according to claim 16 wherein said detecting is accomplished by:
    a) continuously calculating estimates of IMP under conditions of cylinder deactivation;
    b) comparing those estimates to information regarding the compressor surge conditions of the engine to determine whether deactivation of one or more cylinders can occur without presenting a risk of compressor surge;
    c) using information developed by that comparison determine whether the deactivation of one or more cylinders should occur or be delayed;
    d) causing the cylinder deactivation module to deactivate the greatest number of cylinders that can be deactivated without presenting a risk of compressor surge;
    e) continuing to calculate estimates of IMP under conditions of cylinder deactivation;
    f) comparing those estimates to information regarding the compressor surge conditions of the engine to determine whether deactivation of one or more additional cylinders can occur without presenting a risk of compressor surge;
    g) using information developed by that comparison determine whether the deactivation of one or more additional cylinders can occur or should be delayed;
    h) causing the cylinder deactivation module to deactivate the greatest number of cylinders that can be deactivated without presenting a risk of compressor surge.
19. A turbocharged diesel engine according to claim 13 wherein the engine control module is adapted to detect when the engine is transitioning from a high-load engine operation above 3 bar brake mean effective pressure (BMEP) to a non-fired engine operation.
20. A turbocharged diesel engine according to claim 13 wherein the engine control module is adapted to detect when the engine is transitioning from a high-load engine operation above 3 bar brake mean effective pressure (BMEP) to a low-load engine operation below 0.5 bar BMEP.
21. A turbocharged diesel engine according to claim 13 wherein the engine control module is adapted to delay cylinder deactivation for a fixed period of time.
22. A turbocharged diesel engine according to claim 13 wherein the engine control module is adapted to delay cylinder deactivation for a fixed period of time calculated from information about the current speed and load conditions of the engine.
23. A turbocharged diesel engine according to claim 13 wherein the engine control module is adapted to delay cylinder deactivation for a fixed period of time calculated using the compressor surge line of the engine.
24. A turbocharged diesel engine according to claim 21 wherein said fixed time is between 0.5 seconds and 3 seconds.
25. A turbocharged diesel engine according to claim 13 wherein the engine additionally comprises:
    a sensor or system for measuring, or a system for calculating from known parameters, the mass flow rate of fresh air leaving the compressor of the engine;
    a sensor for measuring the intake manifold pressure of the engine; and
    information storage effective for storing information comprising: i) the displacement of the engine, and ii) the volumetric efficiency of the engine;
    wherein the engine control module and the CDA controller work together to calculate estimates of changes in intake manifold pressures over time, and then to compare those estimates to information regarding the compressor surge conditions of the engine to determine whether deactivation of one or more cylinders will avoid compressor surge.
26. A turbocharged diesel engine, comprising:
    a) a plurality of cylinders;
    b) an air intake;
    c) an air intake manifold;
    d) a compressor;
    e) a turbine;

f) an engine control module (ECM); and
g) a cylinder deactivation (CDA) controller effective for controlling the deactivation of one or more cylinders;
wherein the engine control module is adapted to calculate estimates of changes in intake manifold pressure for specific CDA conditions, and then to compare those estimates to the compressor surge line for that engine to determine whether deactivation of one or more cylinders will avoid compressor surge, and then to move into cylinder deactivation as quickly as possible while avoiding compressor surge;
wherein the engine control module is adapted to detect when the engine is transitioning from a high-load engine operation above 3 bar brake mean effective pressure (BMEP) to a low-load or no-load engine operation.

27. A turbocharged diesel engine according to claim 26, wherein the engine control module is adapted to detect when the engine is transitioning from a high-load engine operation above 3 bar BMEP to a low-load engine operation below 0.5 bar BMEP.

28. A turbocharged diesel engine according to claim 26, wherein the engine control module is adapted to detect when the engine is transitioning from a high-load engine operation above 3 bar BMEP to a non-fired engine operation.

29. A turbocharged diesel engine, comprising:
a) a plurality of cylinders;
b) an air intake;
c) an air intake manifold;
d) a compressor;
e) a turbine;
f) an engine control module (ECM); and
g) a cylinder deactivation (CDA) controller effective for controlling the deactivation of one or more cylinders;
wherein the engine control module is adapted to calculate estimates of changes in intake manifold pressure for specific CDA conditions, and then to compare those estimates to the compressor surge line for that engine to determine whether deactivation of one or more cylinders will avoid compressor surge, and then to move into cylinder deactivation as quickly as possible while avoiding compressor surge;
wherein the engine control module is adapted to detect when the turbocharged diesel engine is at risk of compressor surge, and then to delay part or all of the cylinder deactivation until risk of compressor surge is not indicated; wherein said delaying step is for a fixed period of time of between 0.5 seconds and 3 seconds.

\* \* \* \* \*